United States Patent
Odaira et al.

(10) Patent No.: US 8,060,890 B2
(45) Date of Patent: Nov. 15, 2011

(54) IMAGE PROCESSING APPARATUS AND CONTROL METHOD OF THE SAME

(75) Inventors: Masahiro Odaira, Kawasaki (JP); Fumio Shoji, Tokyo (JP); Takao Ikuno, Yokohama (JP); Yoshiaki Katahira, Yokohama (JP); Toru Fujino, Kawaguchi (JP); Kenji Kasuya, Yokohama (JP); Noritsugu Okayama, Kawasaki (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1156 days.

(21) Appl. No.: 11/571,543

(22) PCT Filed: Jul. 5, 2005

(86) PCT No.: PCT/JP2005/012724
§ 371 (c)(1),
(2), (4) Date: Jan. 2, 2007

(87) PCT Pub. No.: WO2006/006548
PCT Pub. Date: Jan. 19, 2006

(65) Prior Publication Data
US 2008/0046897 A1   Feb. 21, 2008

(30) Foreign Application Priority Data
Jul. 8, 2004   (JP) .................................. 2004-202004

(51) Int. Cl.
*G06F 13/00* (2006.01)
*G06F 3/00* (2006.01)
*G06F 13/20* (2006.01)
(52) U.S. Cl. ............ 719/326; 710/1; 710/313; 711/115; 711/173
(58) Field of Classification Search ........................ None
See application file for complete search history.

(56) References Cited

U.S. PATENT DOCUMENTS
4,823,122 A * 4/1989 Mann et al. .............. 340/825.28
(Continued)

FOREIGN PATENT DOCUMENTS
JP   61-194546   8/1986
(Continued)

OTHER PUBLICATIONS

European Search Report dated Sep. 5, 2008, in application No. 05757729.8.*

*Primary Examiner* — Andy Ho
*Assistant Examiner* — Tuan Dao
(74) *Attorney, Agent, or Firm* — Fitzpatrick, Cella, Harper & Scinto (57) ABSTRACT

An apparatus, method, and program accesses a USB memory in accordance with a request from a PC on a network using a USB host interface, a USB device interface, a network interface, a network manager which inputs, via the network interface, a file access command which requests access to a memory card connected to the USB host interface, a memory manager which inputs the file access command generated inside an apparatus, a file access controller which performs exclusive access control between the file access commands input by the network and memory managers, a SCSI analyzer which converts the file access command selected by the file access controller into a SCSI command, and a memory card access controller which performs exclusive access control between the SCSI command generated by the conversion, and a SCSI command input via the USB device interface and requests access to the memory card.

12 Claims, 8 Drawing Sheets

U.S. PATENT DOCUMENTS

| | | | |
|---|---|---|---|
| 2002/0112008 A1* | 8/2002 | Christenson et al. | 709/206 |
| 2002/0147938 A1* | 10/2002 | Hamilton et al. | 714/6 |
| 2002/0178295 A1* | 11/2002 | Buczek et al. | 709/250 |
| 2003/0063307 A1 | 4/2003 | Shoji et al. | |
| 2003/0225971 A1* | 12/2003 | Oishi et al. | 711/115 |
| 2004/0019706 A1* | 1/2004 | Smith | 710/1 |
| 2004/0103099 A1 | 5/2004 | Minagawa | |
| 2005/0128528 A1 | 6/2005 | Yamada et al. | |

FOREIGN PATENT DOCUMENTS

| | | | |
|---|---|---|---|
| JP | 2002-175286 | | 6/2002 |
| JP | 2003-114769 | | 4/2003 |
| JP | 2004-072351 | | 3/2004 |
| JP | 2004-171299 | | 6/2004 |
| WO | WO 00/57587 | * | 9/2000 |
| WO | WO 03/036486 | * | 5/2003 |

* cited by examiner

NETWORK ACCESS FILE LIST    301

| ACCESSING INSTRUMENT | STATE (IDLE/READ/WRITE) |
|---|---|
| NETWORK | IDLE |
| MEMORY | READ |
| USB | WRITE |

NETWORK ACCESS FILE LIST    302

| FILE POINTER | TYPE OF ACCESS |
|---|---|
| ……… | READ |
| ……… | READ |
| ……… | READ |
| ……… | WRITE |
| ……… | WRITE |

MEMORY ACCESS FILE LIST    303

| FILE POINTER | TYPE OF ACCESS |
|---|---|
| ……… | READ |
| ……… | READ |
| ……… | READ |
| ……… | WRITE |
| ……… | WRITE |

IMAGE PROCESSING APPARATUS AND CONTROL METHOD OF THE SAME

TECHNICAL FIELD

The present invention relates to an image processing apparatus which has a USB host interface, USB device interface, and LAN interface, and performs various processes on an input image.

BACKGROUND ART

An MFP (Multi Function Peripheral) having a plurality of image processing functions, such as a printer and scanner, is conventionally known. One type of MFP can connect to a PC or an external memory by using USB, and can perform reading and writing to the memory (to be referred to as a USB memory hereinafter) connected by USB from an operation unit of the MFP or from the PC (USB-PC) connected by USB. This makes it possible to, e.g., store an image read by a scanner into the USB memory, store data received from the USB-PC into the USB memory, print an image stored in the USB memory by the MFP, and read out data from the USB memory and transfer the readout data to the PC. An MFP having a network I/F is also known, and this MFP can be operated as a network printer and a network scanner (Japanese Patent Laid-Open No. 2003-114769).

In the conventional MFP, however, the USB-PC alone can access the USB memory, and no PC on the network can access the USB memory.

DISCLOSURE OF INVENTION

The present invention has been made to solve the above problem of the prior art, and provides an image processing apparatus capable of easily and appropriately accessing a USB memory in accordance with a request from a PC on a network, and a control method of the same.

According to a first aspect of the present invention, an image processing apparatus, which has a USB (Universal Serial Bus) host interface, a USB device interface, and a network interface, and performs various processes for input image data, includes: first input means for inputting, via the network interface, a first file access command which requests access to a storage medium connected to the USB host interface; second input means for inputting a second file access command generated inside the image processing apparatus; file access control means for performing exclusive access control between the first file access command input by the first input means, and the second file access command input by the second input means; command conversion means for converting either the first file access command or the second file access command selected by the exclusive access control by the file access control means into a SCSI (Small Computer System Interface) command; and storage medium access control means for performing exclusive access control between the SCSI command generated by the conversion by the command conversion means, and a SCSI command which is input via the USB device interface and for requesting access to the storage medium.

According to a second aspect of the present invention, a control method of an image processing apparatus is provided. The apparatus comprises: a USB host interface; a USB device interface; a network interface; first input means for inputting, via the network interface, a first file access command which requests access to a storage medium connected to the USB host interface; and second input means for inputting a second file access command generated inside the image processing apparatus. The method comprises: a file access control step of performing exclusive access control between the first file access command input by the first input means, and the second file access command input by the second input means; a command conversion step of converting either the first file access command or the second file access command selected by the exclusive access control in the file access control step into a SCSI command; and a storage medium access control step of performing exclusive access control between the SCSI command generated by the conversion in the command conversion step, and a SCSI command which is input via the USB device interface and of requesting s access to the storage medium.

According to a third aspect of the present invention, a control program of an image processing apparatus is provided. The apparatus comprises: a USB host interface; a USB device interface; a network interface; first input means for inputting, via the network interface, a first file access command which requests access to a storage medium connected to the USB host interface; and second input means for inputting a second file access command generated inside the image processing apparatus. The control program causes a computer to execute: a file access control step of performing exclusive access control between the first file access command input by the first input means, and the second file access command input by the second input means; a command conversion step of converting either the first file access command or the second file access command selected by the exclusive access control in the file access control step into a SCSI command; and a storage medium access control step of performing exclusive access control between the SCSI command generated by the conversion in the command conversion step, and a SCSI command which is input via the USB device interface and of requesting access to the storage medium.

Other features and advantages of the present invention will be apparent form the following description taken in conjunction with the accompanying drawings, in which like reference characters designate the same or similar parts throughout the figures thereof.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
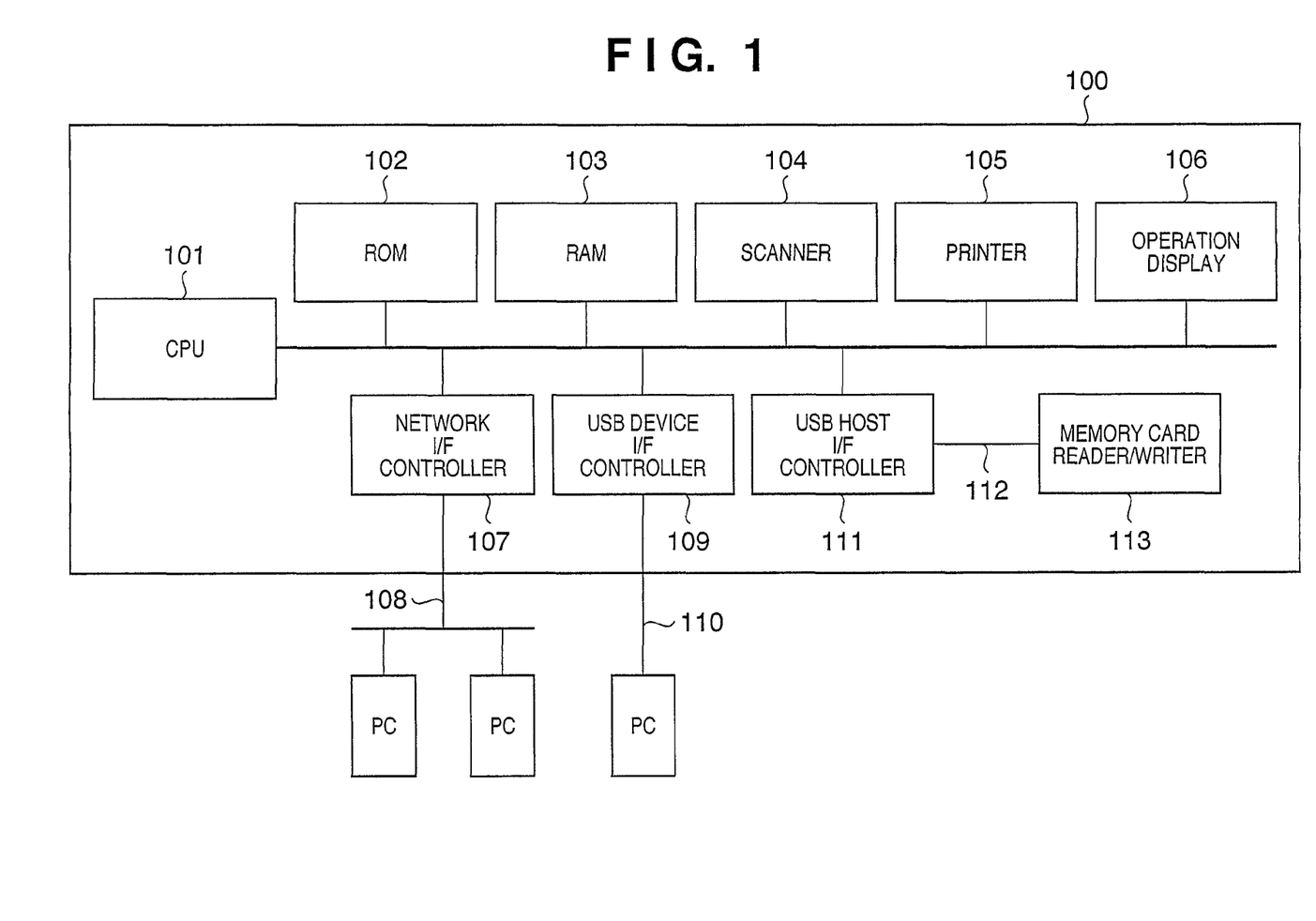
FIG. 1 is a block diagram showing the hardware configuration of an MFP 100 as an embodiment of the present invention.

FIG. 1 is a block diagram showing the arrangement of an MFP as an embodiment of an image processing apparatus according to the present invention.

Referring to FIG. 1, an MFP 100 has a CPU 101, a ROM 102, a RAM 103, a scanner 104, a printer 105, an operation display 106, a network I/F controller 107, a network I/F 108, a USB device I/F controller 109, a USB device I/F 110, a USB host I/F controller 111, a USB host I/F 112, and a memory card reader/writer 113.

The CPU 101 is a system controller, and controls the whole of the MFP 100. The ROM 102 stores a control program of the CPU 101.

The RAM 103 is, e.g., an SRAM or DRAM, and stores program control variables and the like. The RAM 103 also stores set values registered by the user of the MFP 100, management data and the like of the MFP 100, and various work buffers.

The scanner 104 is made up of a CS image sensor, a document feeding mechanism, and the like, and optically reads an original, and converts the read original into electrical image data.

The printer 105 is a device which prints a received image or file data on a printing sheet.

The operation display 106 includes, e.g., a keyboard, a touch panel, an LCD, and an LED, allows the user of the apparatus to perform various operations, and performs display and notification to the user of the apparatus.

The network I/F controller 107 and the USB device I/F controller 110 perform interface control for external PCs connected via the network I/F 108 and USB device I/F 109, respectively, and accept a file access request and a memory card access request from PCs via these interfaces.

The USB host I/F controller 111 performs interface control for the memory card reader/writer 113 connected via the USB host I/F 112. A memory card is inserted into the memory card reader/writer 113.

Figure 2:
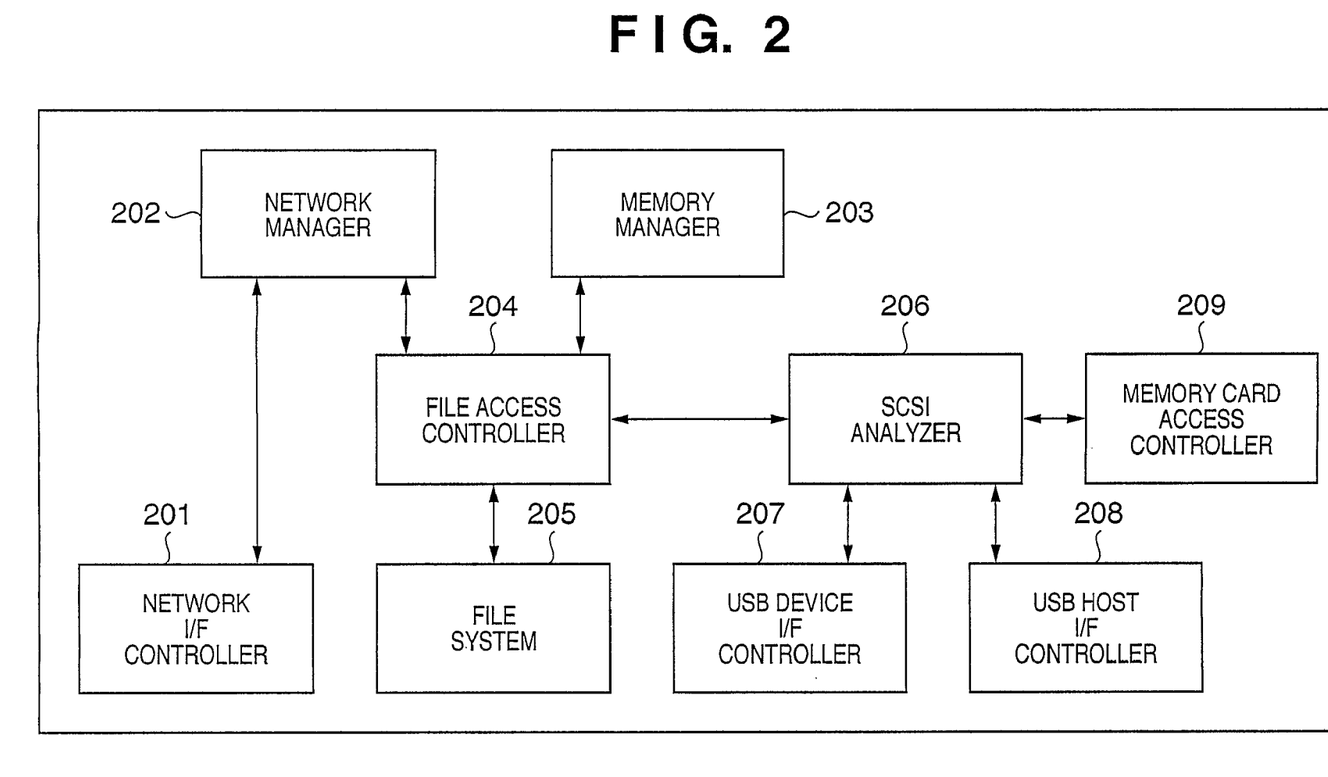
FIG. 2 is a block diagram showing the software configuration of the MFP 100 as the embodiment of the present invention.

FIG. 2 is a block diagram showing the software configuration of the MFP.

A network manager 202 manages a network I/F controller 201, and transfers a file access request from the network to a file access controller 204. Also, a memory manager 203 manages the internal memory of the apparatus, and transfers a file access request from inside the apparatus to the file access controller 204. Examples of file access from inside the apparatus to the memory card inserted into the memory card reader/writer 113 are a process for storing an image read by the scanner 104 in the memory card, a process for printing a file stored in the memory card at the printer 105, a process for storing data and images received from other apparatuses in the memory card, and a process for transmitting a file (data and images) stored in the memory card to other apparatuses. In this case, any communication method used for communications with other apparatuses can be employed. Examples of the communication methods are Internet FAX, e-mail (e-mail text and attached file are stored in the memory card), FTP (File Transfer Protocol), communication using a FAX communication unit (not shown), and HTTP (HyperText Transfer Protocol).

The file access controller 204 converts, by referring to a file system 205, the file access request from the network manger 202 or memory manager 203 into a SCSI command representing a memory card access request, and sends the SCSI command to a SCSI analyzer 206.

A USB device I/F controller 207 sends a memory card access request (SCSI command) from a USB-PC connected to the USB device I/F to the SCSI analyzer 206.

The SCSI analyzer 206 controls the memory card access request (SCSI command), and realizes access to a memory card by transmitting the SCSI command to the memory card reader/writer 113 via a USB host I/F 208. In this case, a memory card access controller 209 determines whether access to the memory card is possible, in order to perform exclusive access control for the memory card.

Figure 3:
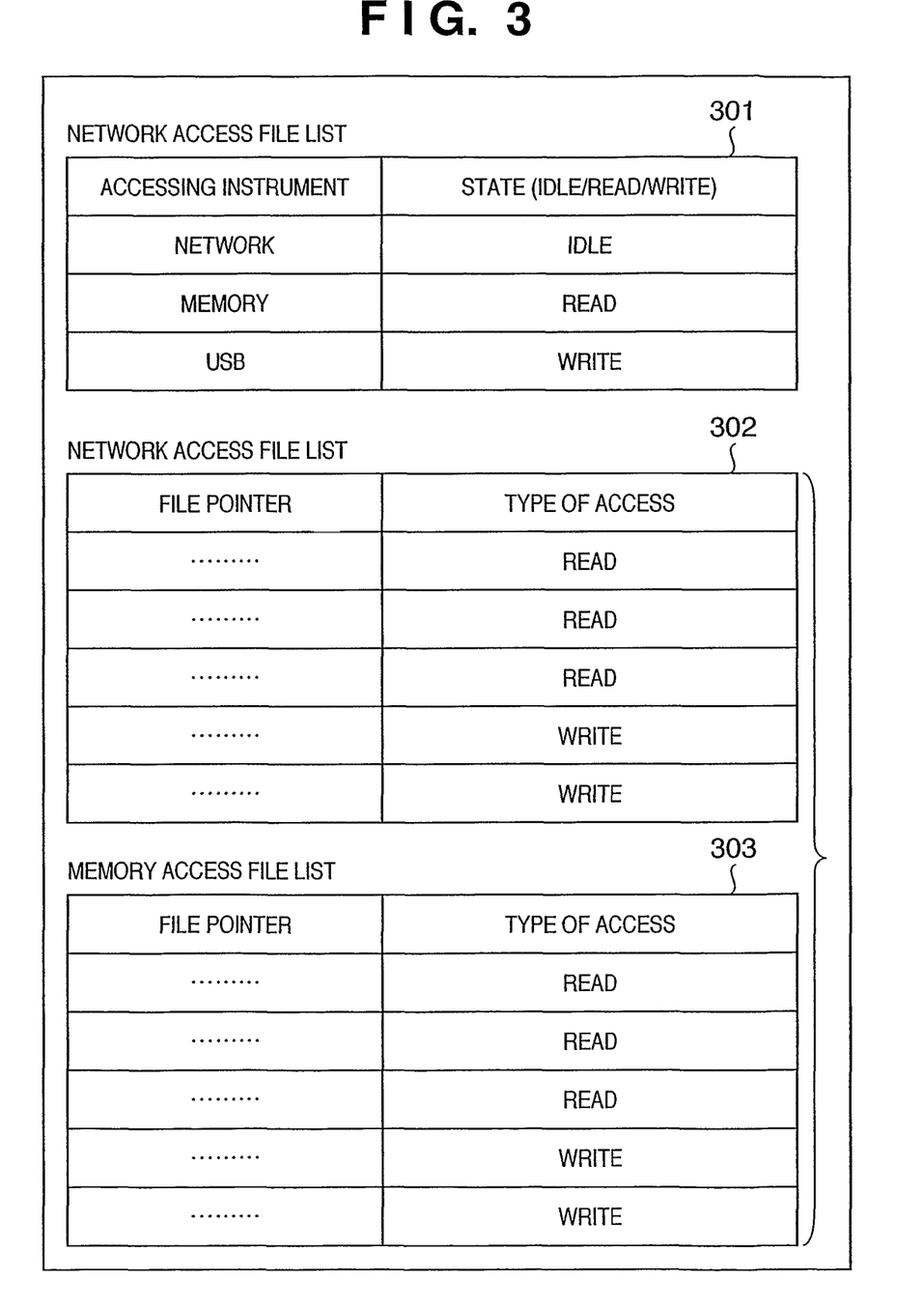
FIG. 3 is a view showing information managed by a memory card access controller of the MFP 100 as the embodiment of the present invention.

FIG. 3 is a view showing tables managed by the memory card access controller.

Reference numeral 301 denotes an access state table indicating how each accessing instrument is accessing a memory card in the MFP. In this embodiment, the network, the memory (inside the MFP), and the USB are defined as accessing instruments. IDLE indicates a state in which no access is being performed; READ, a state in which READ access is being performed; and WRITE, a state in which WRITE access is being performed.

Reference numerals 302 and 303 denote tables each indicating an access file list of each file accessing instrument (the network or the memory (inside the MFP)). These tables store file pointers of all files currently being accessed, and information concerning access types (READ and WRITE).

Figure 4:
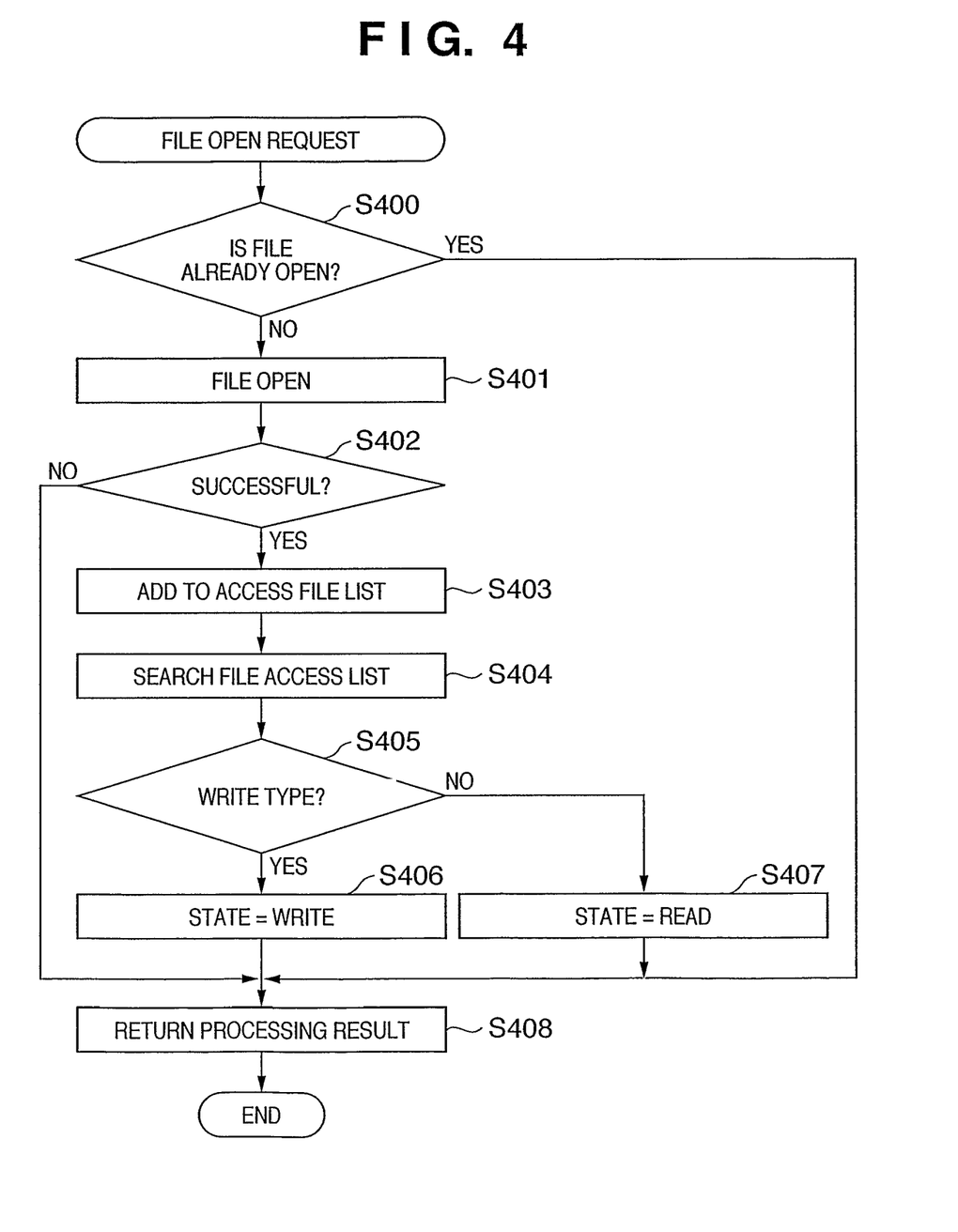
FIG. 4 is a flowchart showing processing when a file open request is received in the embodiment of the present invention.

FIG. 4 is a flowchart showing processing performed by the file access controller 204 when a file open request is received.

When receiving a file open request from the network manager 202 or memory manager 203, the file access controller 204 determines in step S400 whether the file is already open. If the file is already open, the flow terminates by error. If the file is not open, the flow advances to step S401. If it is determined in step S400 that the file is already open, the flow ends with error. Even if both the network manager 202 and memory manager 203 send file open requests for the same file by changing the type of file access to WRITE, the file can be opened by only the file open request which has been accepted first. The file cannot be opened by the file open request which has been accepted second. This makes it possible to prevent double opening of each file. Each file in the memory card connected to the memory card reader/writer 113 undergoes exclusive control such that the file cannot be simultaneously opened by the network manager 202 and memory manager 203 even if their file open requests have WRITE type of file access.

In step S401, the requested file is opened by referring to the file system 205. If it is determined in step S402 that file open is successful, the flow advances to step S403, and a file pointer and a type of file access are added to the network access file list 302 if the file open request is received from the network manager 202, or a file pointer and a type of file access are added to the memory access file list 303 if the file open request is received from the memory manager 203.

The access file list 302 or 303 is searched in step S404, and, if it is determined in step S405 that either accessing instrument has a WRITE-type access file, the state of the accessing instrument is changed to WRITE in the memory card access state table 301 in step S406, and the flow advances to step S408. If it is determined in step S405 that there is no WRITE type, the state of the accessing instrument is changed to READ in the memory card access state table 301 in step S407, and the flow advances to step S408. If it is determined in step S402 that file open has failed, the flow advances to step S408. In step S408, the result of processing for the file open request is returned.

Note that in step S400, the flow terminates by error if the file is already open. Even when the file is already open, however, the flow may also advance to step S403 instead of terminating by error if no WRITE type is found when the access file list 302 or 303 is searched and if the newly input access request is READ.

Figure 5:
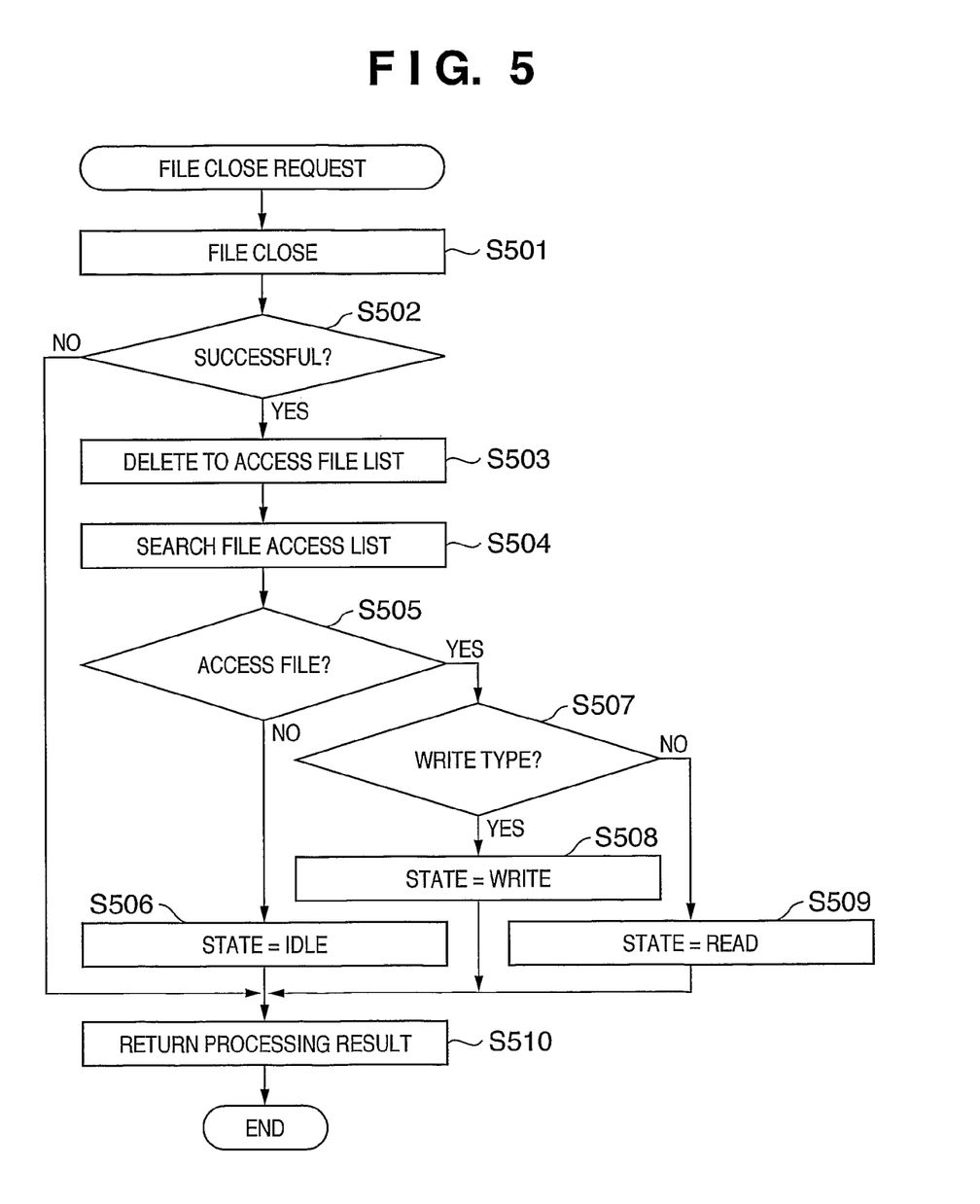
FIG. 5 is a flowchart showing processing when a file close request is received in the embodiment of the present invention.

FIG. 5 is a flowchart showing processing performed by the file access controller 204 when a file close request is received.

When receiving a file close request, the file is closed via the file system 205 in step S501. If it is determined in step S502 that file close is successful, the flow advances to step S503 to delete a file pointer and a type of file access from the access file list 302 or 303. Then, the access file list 302 or 303 is searched in step S504, and, if it is determined in step S505 that no access file exists, the flow advances to step S506 to change all the state columns in the memory card access state table 301 to IDLE. If it is determined in step S505 that an access file exists, the flow advances to step S507 to determine whether a WRITE-type access file exists in the access file table 302 or 303. If YES in step S507, the state of the corresponding accessing instrument is changed to WRITE in the memory card access state table 301 in step S508, and the flow advances to step S510. If it is determined in step S507 that no WRITE-type access file exists, the state of the corresponding accessing instrument is changed to READ in the memory card access state table 301 in step S509, and the flow advances to step S510. If it is determined in step S502 that file close has failed, the flow advances to step S510. In step S510, the result of processing for the file close request is returned.

Figure 6A:
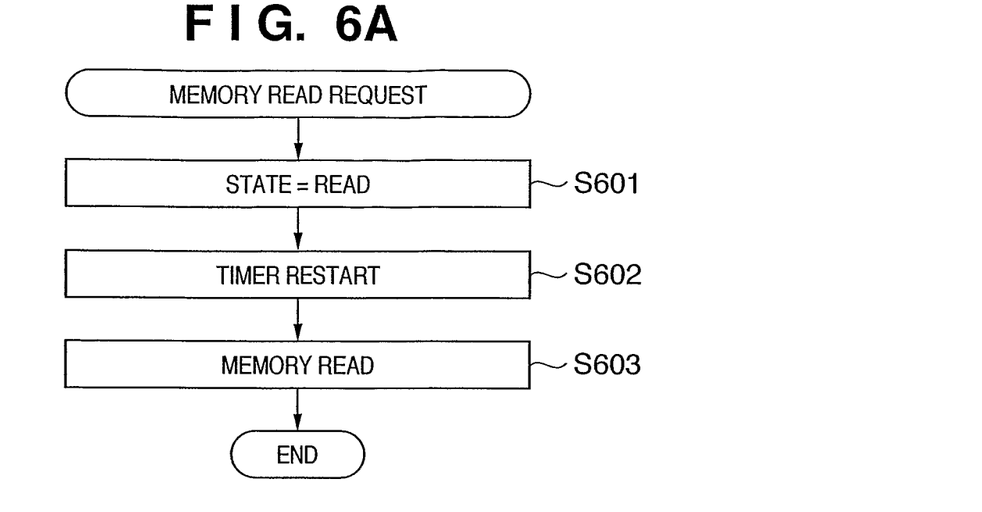
FIGS. 6A to 6C are flowcharts showing processing when a memory card access request is received in the embodiment of the present invention.
Figure 6B:
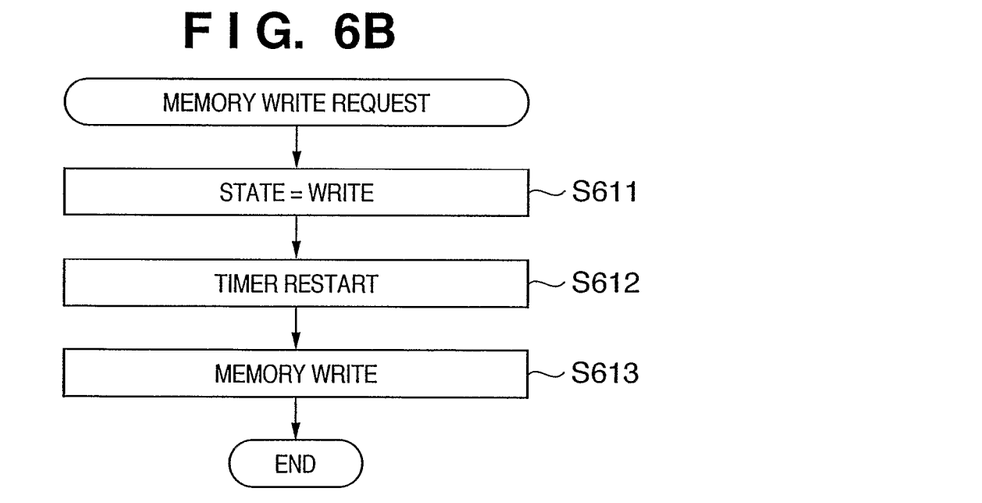
Figure 6C:
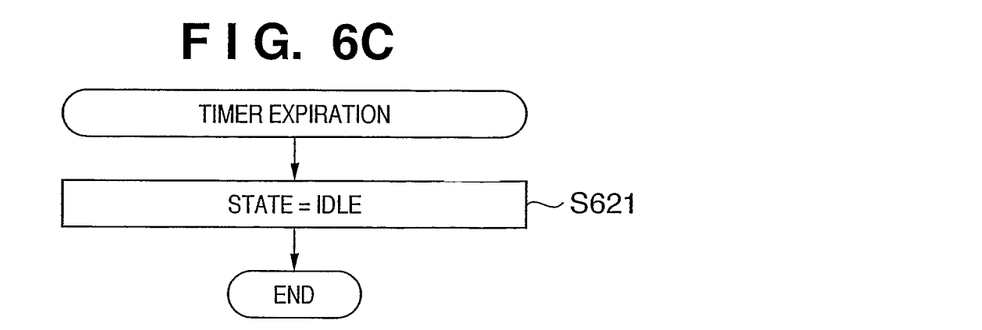

FIGS. 6A to 6C are flowcharts showing processing performed by the USB device I/F controller 207 when a memory card access request is received. FIG. 6A shows processing when a memory READ request is received, FIG. 6B shows processing when a memory WRITE request is received, and FIG. 6C shows processing when a timer has expired.

When a memory READ request is received, in step S601, the memory card access state of the accessing instrument USB in the memory card access state table 301 is changed to READ. In step S602, the timer is restarted (stopped and started if the timer is in operation, and started if the timer is not in operation), and, in step S603, the memory READ request is transferred to the SCSI analyzer 206.

When a memory WRITE request is received, in step S611, the memory card access state of the accessing instrument USB in the memory card access state table 301 is changed to WRITE. In step S612, the timer is restarted, and, in step S613, the memory WRITE request is transferred to the SCSI analyzer 206.

When the timer has expired, in step S621, the memory card access state of the accessing instrument USB in the memory card access state table 301 is changed to IDLE. While the timer is in operation, therefore, the memory card access state is set to READ and WRITE.

Figure 7:
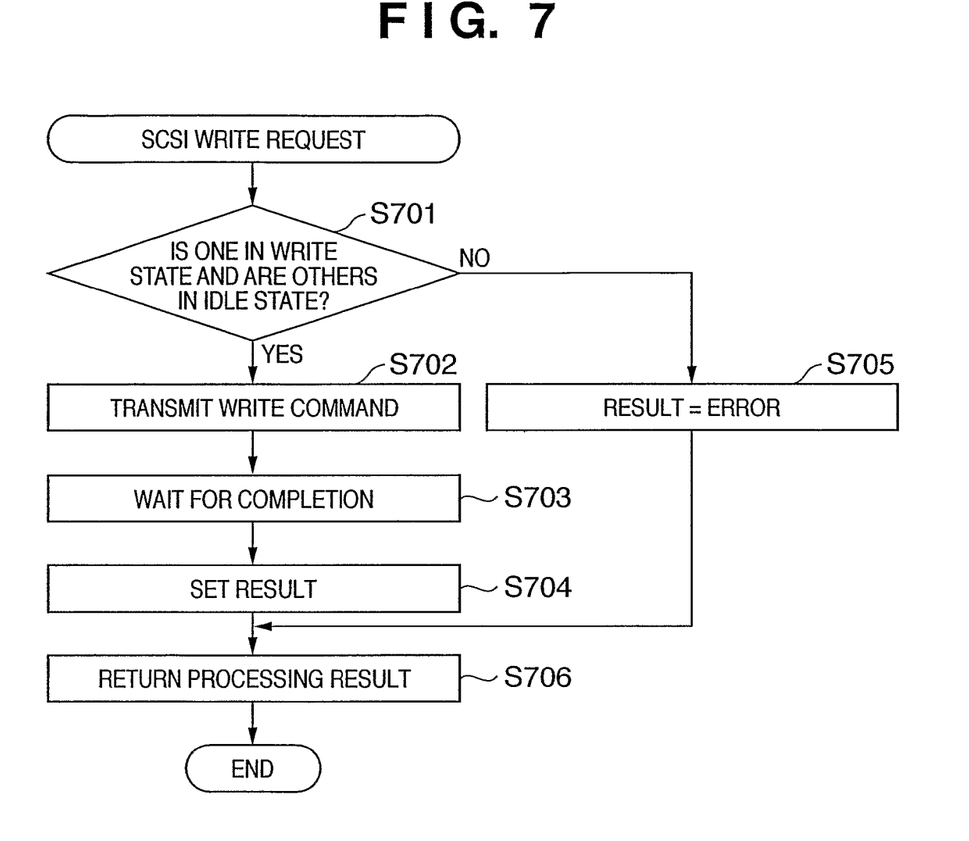
FIG. 7 is a flowchart showing a memory card access confirmation process in the embodiment of the present invention.
Figure 8:
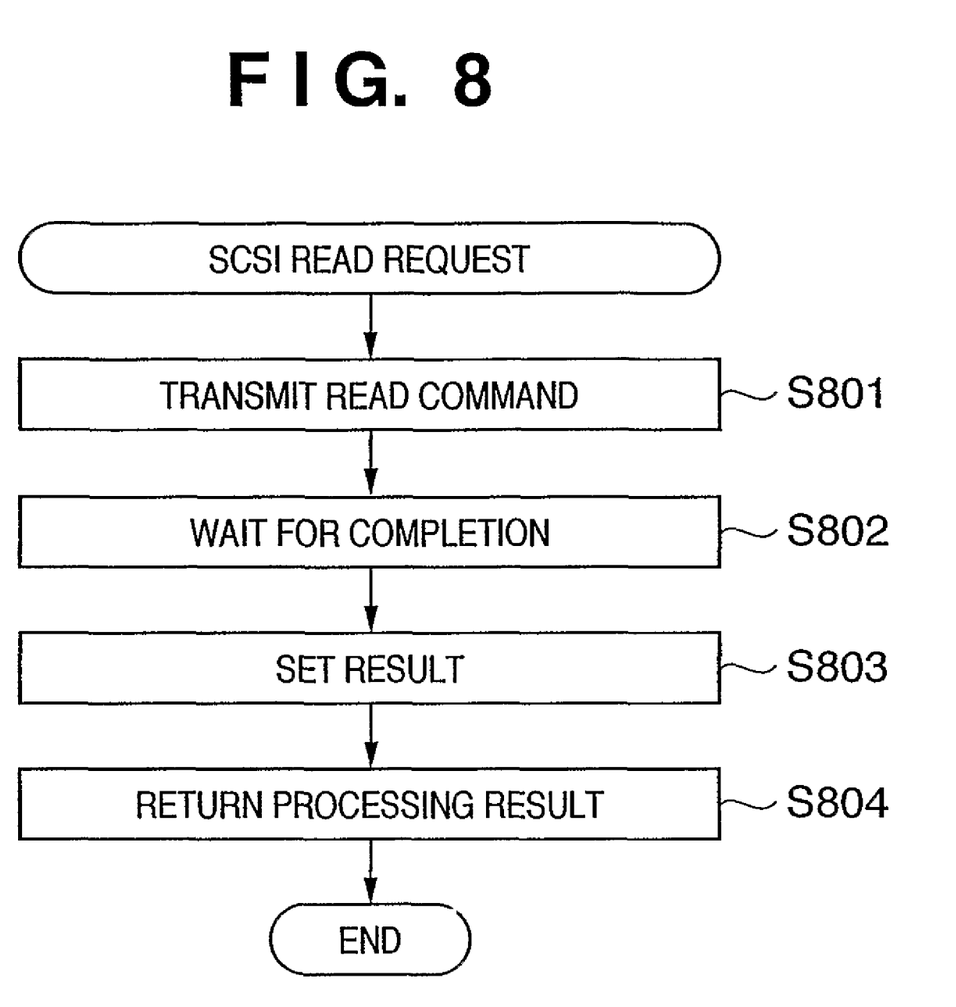
FIG. 8 is a flowchart showing the memory card access confirmation process in the embodiment of the present invention.

FIGS. 7 and 8 are flowcharts showing a memory card access confirmation process performed by the memory card access controller 209. FIG. 7 shows processing when a SCSI WRITE request is received, and FIG. 8 shows processing when a SCSI READ request is received.

As described above, the file access controller 204 performs exclusive control for memory WRITE requests from the network manager 202 and memory manager 203. A memory WRITE request from an external PC connected to the USB device I/F controller 207 cannot be managed by the file access controller 204. The memory WRITE request via the USB device I/F controller 207 and the memory WRITE request via the file access controller 204 must undergo exclusive control. The memory card access controller 209 performs exclusive control for the memory WRITE requests via the USB device I/F controller 207 and file access controller 204. More specifically, control in FIG. 7 is performed as will be described below.

When a SCSI WRITE request is received, in step S701 of FIG. 7, the memory card access state table 301 is searched for the memory card access states to determine whether "an accessing instrument in the WRITE state is only a USB accessing instrument, and all the other accessing instruments are in the IDLE state". Alternatively, it is determined in step S701 whether "an accessing instrument in the WRITE state is a network or memory, and the USB is in the IDLE state".

The expression "an accessing instrument in the WRITE state is only a USB accessing instrument, and all the other accessing instruments are in the IDLE state" indicates that the SCSI analyzer 206 generates a SCSI WRITE request when a memory WRITE request is received from an external PC via the USB device I/F controller 207. The expression "an accessing instrument in the WRITE state is a network or memory, and the USB is in the IDLE state" indicates that the SCSI analyzer 206 generates a SCSI WRITE request when a memory WRITE request is received from the network manager 202 or memory manager 203 via the file access manager 204. As a supplementary explanation, the network manager 202 receives a memory WRITE request from a PC on the network via the network I/F controller 201 to send the memory WRITE request to the SCSI analyzer 206 via the file access controller 204. If YES in step S701, the flow advances to step S702 to perform WRITE access to the memory card by a SCSI WRITE command via the USB host I/F controller 208. The completion of the processing in step S702 is waited for in step S703, and the processing result is saved in step S704. If NO in step S701, the processing result is set to error in step S705. In step S706, the result of processing for the SCSI WRITE request is returned.

When a SCSI READ request is received, in step S801 of FIG. 8, READ access to the memory card is performed by a SCSI READ command via the USB host I/F controller 208. The completion of the processing in step S801 is waited for in step S802, and the processing result is saved in step S803. In step S804, the result of processing for the SCSI READ request is returned.

As described above, WRITE access to the memory card is performed when "there is only one accessing instrument in the WRITE state, and all the other accessing instruments are in the IDLE state", so exclusive access control can be performed for memory card access requests from a plurality of accessing instruments. That is, file access requests from a plurality of accessing instruments, such as a file access request transmitted across the network and a file access request for saving an image file to be processed inside the apparatus, can be processed in turn.

As has been described above, this embodiment includes the file access controller 204 for controlling access to a file, and the memory card access controller 209 for controlling access to a memory card, and thereby can realize file access and memory card access from a plurality of requesting instruments such as a network, the apparatus main body, and a USB (MassStorageClass).

Other Embodiments

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-202004 filed on Jul. 8, 2004, the entire contents of which are hereby incorporated by reference herein.

The invention claimed is:

1. An image processing apparatus for inputting commands via a Universal Serial Bus (USB) host interface, a USB device interface, and a network interface, and for performing various processes for input image data, comprising:
    first input means for inputting, via the network interface of said image processing apparatus, a first file access command which requests access to a storage medium connected to the USB host interface;
    second input means for inputting a second file access command generated inside said image processing apparatus;
    file access control means for performing exclusive access control between the first file access command input by said first input means, and the second file access command input by said second input means;
    command conversion means, which is provided between the file access control means and the USB host interface to acquire any one of the file access commands from the file access control means, for converting either the first file access command or the second file access command selected by the exclusive access control by said file access control means into a Small Computer System Interface (SCSI) command; and
    storage medium access control means for performing exclusive access control between the SCSI command generated by a conversion by said command conversion means, and a SCSI command which is input via the USB device interface of said image processing apparatus without using said file access control means and for requesting access to the storage medium.

2. An image processing apparatus according to claim 1, wherein if a file is already open, said file access control means does not accept the file access command.

3. An image processing apparatus according to claim 1,
    wherein said file access control means registers a file pointer and a type of file access in a network access file list, if a file open operation is successful, and
    wherein if a type of file access in a network access file list indicating that an opened file is being written is not registered in network access file lists, and a newly input file access command is a read command, said file access control means accepts the newly input file access command.

4. An image processing apparatus according to claim 1, wherein said storage medium access control means determines whether to permit or reject access to the storage medium in accordance with a state of access of each accessing instrument which is to access the storage medium.

5. A control method of an image processing apparatus comprising a Universal Serial Bus (USB) host interface, a USB device interface, a network interface, first input means for inputting, via the network interface of the image processing apparatus, a first file access command which requests access to a storage medium connected to the USB host interface, and second input means for inputting a second file access command generated inside the image processing apparatus, said control method comprising:
    a file access control step of performing, with file access control means, exclusive access control between the first file access command input by the first input means, and the second file access command input by the second input means;

a command conversion step, performed with command conversion means provided between the file access control means and the USB host interface to acquire any one of the file access commands from the file access control means, of converting either the first file access command or the second file access command selected by the exclusive access control in said file access control step into a Small Computer System Interface (SCSI) command; and a storage medium access control step of performing exclusive access control between the SCSI command generated by a conversion in said command conversion step, and a SCSI command which is input via the USB device interface of the image processing apparatus without using said file access control step and of requesting access to the storage medium.

6. A control program of an image processing apparatus comprising: a Universal Serial Bus (USB) host interface; a USB device interface; a network interface; first input means for inputting, via the network interface of the image processing apparatus, a first file access command which requests access to a storage medium connected to the USB host interface; and second input means for inputting a second file access command generated inside the image processing apparatus, said control program causing a computer to execute:

a file access control step of performing, with file access control means, exclusive access control between the first file access command input by the first input means, and the second file access command input by the second input means;

a command conversion step, performed with command conversion means provided between the file access control means and the USB host interface to acquire any one of the file access commands from the file access control means, of converting either the first file access command or the second file access command selected by the exclusive access control in said file access control step into a Small Computer System Interface (SCSI) command; and a storage medium access control step of performing exclusive access control between the SCSI command generated by a conversion in said command conversion step, and a SCSI command which is input via the USB device interface of the image processing apparatus without using said file access control step and of requesting access to the storage medium.

7. A method according to claim 5, wherein if a file is already open, said file access control step does not accept the file access command.

8. A program according to claim 6, wherein if a file is already open, said file access control step does not accept the file access command.

9. A method according to claim 5,
wherein said file access control step registers a file pointer and a type of file access in a network access file list, if a file open operation is successful, and if a type of file access in a network access file list indicating that an opened file is being written is not registered in network access file lists, and a newly input file access command is a read command, the image processing apparatus accepts the newly input file access command.

10. A program according to claim 6,
wherein said file access control step registers a file pointer and a type of file access in a network access file list, if a file open operation is successful, and wherein if a type of file access in a network access file list indicating that an opened file is being written is not registered in network access file lists, and a newly input file access command is a read command, the image processing apparatus accepts the newly input file access command.

11. A method according to claim 5, wherein said storage medium access control step determines whether to permit or reject access to the storage medium in accordance with a state of access of each accessing instrument which is to access the storage medium.

12. A program according to claim 6, wherein said storage medium access control step determines whether to permit or reject access to the storage medium in accordance with a state of access of each accessing instrument which is to access the storage medium.

* * * * *